US010234632B1

United States Patent
Keeler et al.

(10) Patent No.: US 10,234,632 B1
(45) Date of Patent: Mar. 19, 2019

(54) CONNECTORS FOR MULTICORE OPTICAL FIBERS AND METHODS THEREOF

(71) Applicant: National Technology & Engineering Solutions of Sandia, LLC, Albuquerque, NM (US)

(72) Inventors: Gordon Arthur Keeler, Albuquerque, NM (US); Darwin K. Serkland, Albuquerque, NM (US); Kent M. Geib, Tijeras, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 36 days.

(21) Appl. No.: 15/238,518

(22) Filed: Aug. 16, 2016

Related U.S. Application Data

(60) Provisional application No. 62/206,704, filed on Aug. 18, 2015.

(51) Int. Cl.
| | |
|---|---|
| *G02B 6/38* | (2006.01) |
| *G02B 6/32* | (2006.01) |
| *G02B 6/02* | (2006.01) |
| *H04B 10/2581* | (2013.01) |
| *G02B 6/42* | (2006.01) |

(52) U.S. Cl.
CPC ........... *G02B 6/32* (2013.01); *G02B 6/02042* (2013.01); *G02B 6/3834* (2013.01); *G02B 6/3853* (2013.01); *G02B 6/4204* (2013.01); *H04B 10/2581* (2013.01)

(58) Field of Classification Search
CPC ...... G02B 6/3893; G02B 6/3825; G02B 6/38; G02B 6/3885; G02B 6/3887; G02B 6/3821
See application file for complete search history.

(56) References Cited

U.S. PATENT DOCUMENTS

| | | | |
|---|---|---|---|
| 6,563,976 B1 * | 5/2003 | Grann | G02B 6/29311 385/24 |
| 6,628,695 B1 | 9/2003 | Aldaz et al. | |
| 7,218,388 B1 | 5/2007 | Keeler et al. | |
| 7,393,145 B1 | 7/2008 | Stevens et al. | |
| 7,434,299 B1 | 10/2008 | Gill et al. | |
| 7,859,350 B1 | 12/2010 | Schwindt et al. | |
| 8,824,519 B1 | 9/2014 | Seurin et al. | |
| 8,907,439 B1 | 12/2014 | Kay et al. | |
| 8,929,407 B2 | 1/2015 | Seurin et al. | |

(Continued)

OTHER PUBLICATIONS

Geib, K.M. et al., "Photonics Technology Development for Optical Fuzing", Proc. of SPIE, vol. 5871 (2005), pp. 58710J-1-58710J-12.

(Continued)

*Primary Examiner* — Jennifer Doan
(74) *Attorney, Agent, or Firm* — Martin I. Finston; Helen S. Baca

(57) ABSTRACT

The present invention relates to optical coupling systems that employ a multicore optical fiber. The system can be employed with two multicore optical fibers or with a single multicore optical fiber for use with an optical device. In particular, the system includes connectors having a lens assembly configured to relay optical signals and a ferrule to position the lens assembly. Additional details for making and using such systems are described herein.

13 Claims, 9 Drawing Sheets

(56) References Cited

U.S. PATENT DOCUMENTS

| 9,025,917 B2* | 5/2015 | Aoki | G02B 6/327 |
|---|---|---|---|
| | | | 385/33 |
| 2003/0190115 A1* | 10/2003 | Culver | G02B 6/29358 |
| | | | 385/18 |
| 2014/0153881 A1 | 6/2014 | Liff et al. | |
| 2016/0246015 A1* | 8/2016 | Case | G02B 6/4206 |

OTHER PUBLICATIONS

Von Der Lippe, et al., Photonics Technology Development for Optical Fuzing, Proceedings for the Army Science Conference (24th) Held on Nov. 29-Dec. 2, 2005 in Orlando, Florida, pp. 1-5.

* cited by examiner

CONNECTORS FOR MULTICORE OPTICAL FIBERS AND METHODS THEREOF

CROSS-REFERENCE TO RELATED APPLICATION

This application claims priority to U.S. Provisional Patent Application No. 62/206,704, filed on Aug. 18, 2015 under the title, "CONNECTORS FOR MULTICORE OPTICAL FIBERS AND METHODS THEREOF," the entirety of which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to optical coupling systems that employ a multicore optical fiber. The system can be employed with two multicore optical fibers or with a single multicore optical fiber for use with an optical device. In particular, the system includes connectors having a lens assembly configured to relay optical signals and a ferrule to position the lens assembly.

Additional details for making and using such systems are described herein.

BACKGROUND OF THE INVENTION

Multicore optical fibers (MCFs) are single fiber strands created with multiple cores to guide light. MCFs are currently being considered for use in telecommunications, data center communications, and high-performance computing applications. It is believed that spatial division multiplexing with MCFs (i.e., using each core as a separate channel) will enable higher fiber bandwidth and channel density than traditional single-core fibers. While fiber manufacturers are presently developing MCF prototypes, numerous commercialization issues remain, including fiber-to-fiber connectorization and fiber-to-photonics interfacing at the ends of each link. Accordingly, there is a need for new optical coupling systems capable of relaying and transmitting optical signals between MCFs and other optical devices for use with such MCFs.

SUMMARY OF THE INVENTION

The present invention relates to optical coupling systems in which optical signals are transmitted through one or more MCFs. In particular, the systems employ a lens assembly capable of guiding light out of a MCF and into another optical apparatus, such as a MCF or an optical device (e.g., an optoelectronic device, such as a photodetector, a photoemitter, or any described herein). Also described herein are methods for interfacing optoelectronics with MCFs, and methods for implementing optical fiber connectors for MCF cables. Additional details follow.

Definitions

As used herein, the term "about" means+/−10% of any recited value. As used herein, this term modifies any recited value, range of values, or endpoints of one or more ranges.

By "micro" is meant having at least one dimension that is less than 1 mm. For instance, a microstructure (e.g., any structure described herein, such as a microlens) can have a length, width, height, cross-sectional dimension, circumference, radius (e.g., external or internal radius), or diameter that is less than 1 mm.

By "microlens" is meant a lens having a dimension (e.g., a diameter) that is sized to receive an optical signal from a single core of a multicore optical fiber. In one non-limiting example, a microlens has a diameter of from about 5 μm to about 200 μm.

By "macrolens" is mean a lens having a dimension (e.g., a diameter) that is sized to receive an optical signal from each core of a multicore optical fiber. In one non-limiting example, a macrolens has a diameter of from about 200 μm to about 1 mm.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

The present invention relates to an optical coupling system for use with at least one multicore optical fiber. The system employs a connector to optically relay signals to or from the optical fiber, as well as into another optical component, such as another optical fiber (e.g., a MCF), a photoemitter, a photodetector, or another optical device (e.g., an optoelectronic device).

Figure 1:
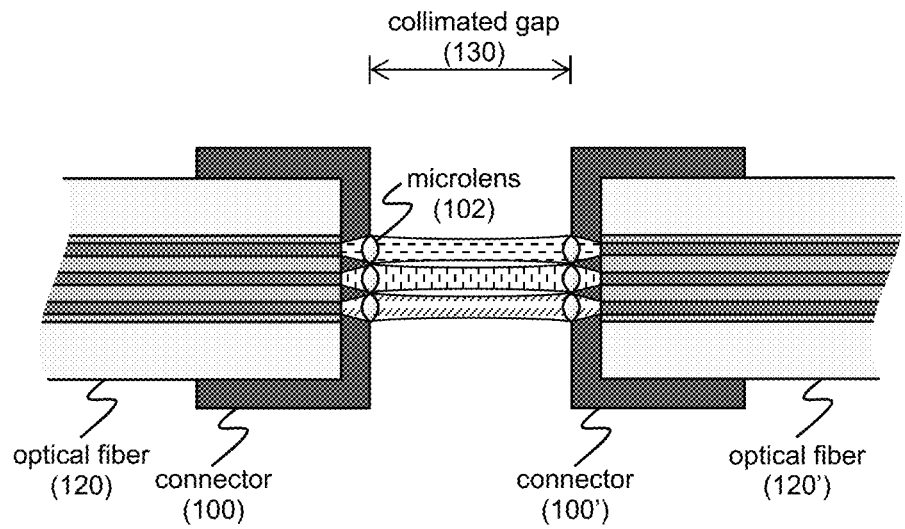
FIG. 1 provides a schematic of an exemplary optical coupling system for a first optical fiber 120 to a second optical fiber 120' using microlenses 102.

FIG. 1 provides a coupling system including two connectors 100,100'. The first connector 100 is configured to transmit an optical signal from a first multicore optical fiber 120 (MCF). As can be seen, the connector 100 includes a subarray of microlenses 102, in which each microlens is configured to be aligned with each core of the MCF. The second connector 100' is configured likewise to transmit an optical signal to a second MCF 120'. That is, the second connector 100' includes a subarray of microlenses, in which each microlens is configured to be aligned with each core of the second MCF 120'. The array or subarray of microlenses can be provided in an assembly, such as a substrate upon with the array or subarray is disposed.

The collimated gap 130 between the two connectors 100,100' can be maintained to minimize insertion loss. This collimated gap between connectors, which is a variable distance, reduces sensitivity to misalignment. Such microlens assemblies can support collimated beams over many millimeters before diffraction becomes problematic. In this configuration, the beam from each core never overlaps, such that each core within the MCF can be used as a separate channel. Each MCF can support any number of cores (e.g., as described herein), and the corresponding microlens assembly can have any number of microlenses that accounts for each core.

Figure 2:
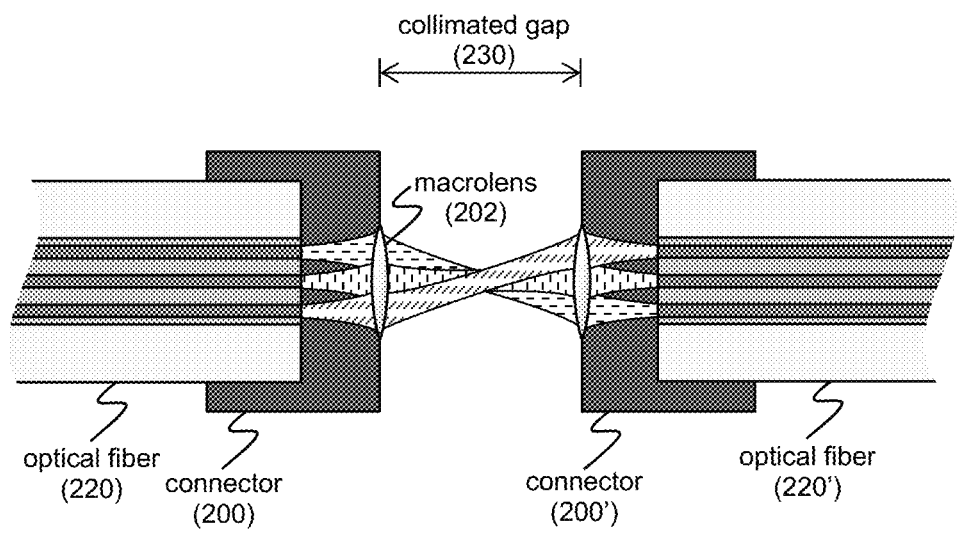
FIG. 2 provides a schematic of an exemplary optical coupling system for a first optical fiber 220 to a second optical fiber 220' using macrolenses 202.

The coupling system can employ any useful assembly of lenses. FIG. 2 provides an alternative coupling system, in which all beams overlap upon being transmitted by the first MCF. This system relies on a configuration that includes one macrolens pair, in which all optical beams overlap but are separated by imaging. As can be seen, the coupling system includes a first connector 200 configured to transmit an optical signal from a first MCF 220, in which the connector 200 includes a macrolens 202 configured to receive an optical signal from all cores of the MCF. The second connector 200' likewise includes a macrolens and is configured to adapt to an end of a second MCF 220'. The connector can be configured to maintain the lens at any useful separation distance from an end of the MCF (e.g., a separation distance of about a focal length of the lens, such as an f of from about 20 µm to about 200 µm).

The collimated gap 230 (e.g., a gap having a distance that is about 2 times the focal length f of the lens) between the connectors reduces sensitivity to misalignment. In addition, as compared to a connector employing microlenses, the use of the macrolens allows for a longer collimated gap, which in turn may allow for a free-space 90° turn between the first and second MCFs 220,220'.

The coupling system can be modified to accommodate a cable, which includes a plurality of MCFs. For instance, the connector can include a lens assembly that includes an array of macrolenses, in which each macrolens is configured to be aligned with each MCF. In another instance, the connector can include a lens assembly that includes an array of subarrays, in which each subarray includes a plurality of microlenses. In this way, each subarray is coupled to each MCF within the cable, and each microlens in the subarray aligns with each core of the MCF. Such lens assemblies can be provided as a substrate upon with the array or subarray is disposed.

The optical coupling system can be configured to relay (e.g., to transmit or receive) optical signals to or from an optical device or an MCF. Exemplary optical devices include a photoemitter configured to generate an optical signal or a photodetector configured to detect an optical signal. MCFs can be used to relay signals to and from these optical devices, in which each optical signal can be carried separately within each channel afforded by each core or combined upon being outputted by the MCF.

Figure 3:
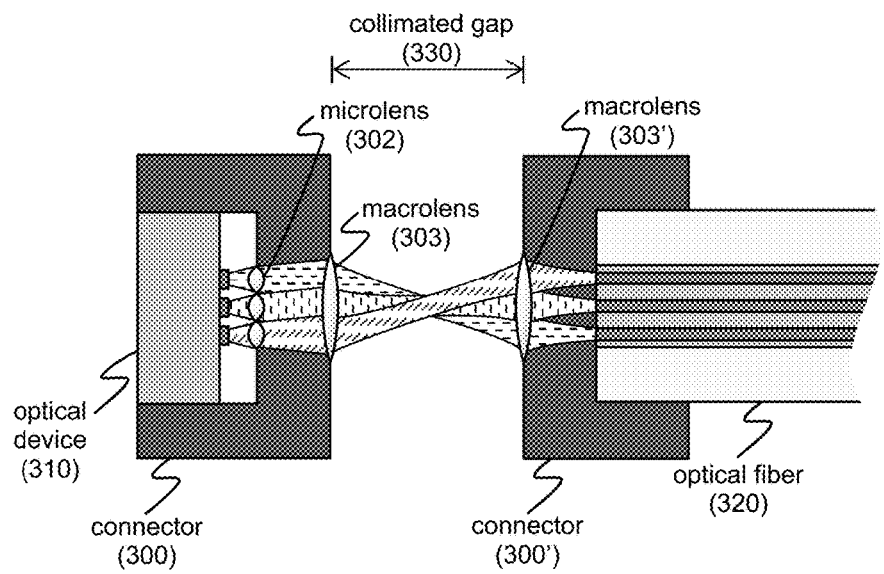
FIG. 3 provides a schematic of an exemplary optical coupling system for an optical device 310 to an optical fiber 320 using a hybrid approach that includes both microlenses 302 and macrolenses 303.

FIG. 3 provides an exemplary optical coupling system for use with an optical device 310 and an optical fiber 320. A first connector 300 is configured to transmit an optical signal from or to an optical device 310. As can be seen, the first connector 300 includes a plurality of microlenses 302, which convert the optical signal from high divergence (e.g., as for a VCSEL or a photodetector) to low divergence (e.g., as for an MCF). In addition, each of the first connector 300 and second connector 300' includes a macrolens 303,303' to relay the optical beam to or from the MCF 320. Again, the collimated space 330 between connectors reduces sensitivity to misalignment. Due to the large allowable gap (e.g., a collimated space having a distance of about 2f), the collimated space can accommodate a turn (e.g., a 90° turn), which can be implemented by using a reflector or an array of reflectors. Such turns can be useful for forming integrated optical connections between optical devices (e.g., disposed on substantially planar substrates) and optical fibers.

The optical coupling system can include any other useful components. For instance, one or more reflectors can be employed to provide a turn in the optical path. In another instance, any useful optical lens assembly can be combined to direct the optical path and to control the divergence or convergence of optical beams. In yet another instance, the coupling system can include a connector for each fiber and/or optical device; or an integrated connector can be disposed between the fiber-to-device or fiber-to-fiber connection.

Figure 4A:
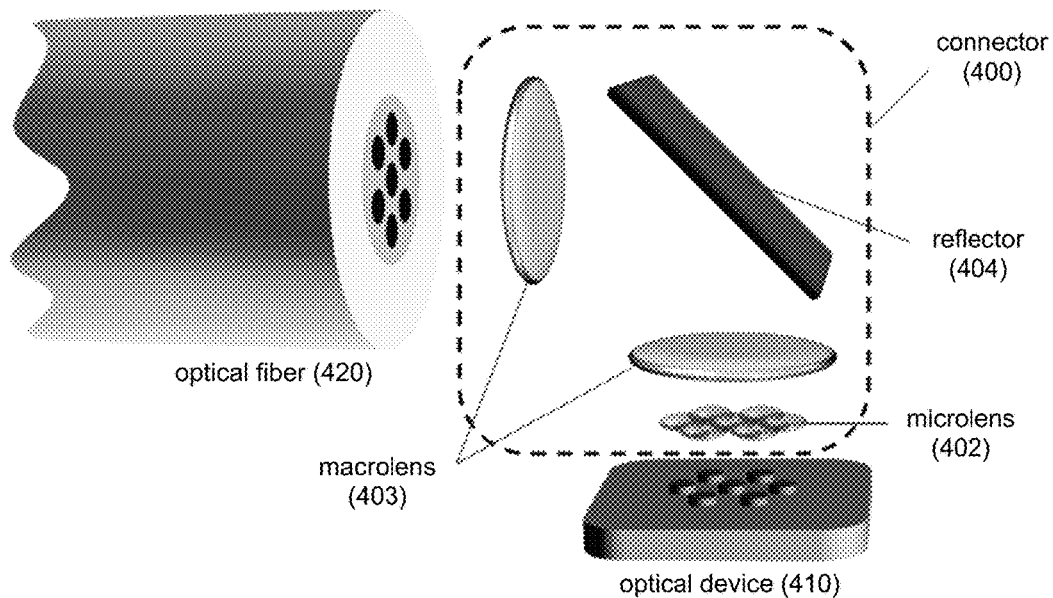
FIG. 4A-4C provides a schematic of other exemplary optical coupling systems for an optical device to an optical fiber. Shown are systems using (A) a hybrid approach that includes both microlenses 402 and macrolenses 403, (B) an integrated connector 4000 including microlenses 4002, and (C) two connectors 4100,4100' that each include a subarray of microlenses 4102.

For instance, FIG. 4A provides an exemplary optical coupling system, which includes an integrated connector 400 disposed between an optical device 410 and an optical fiber 420. As can be seen, the connector 400 includes a plurality of microlenses 402, which convert the optical signal from high divergence (e.g., as for a VCSEL or a photodetector) to low divergence (e.g., as for an MCF). In addition, the connector 400 includes a reflector 404 to divert the optical path, as well as a pair of macrolenses 403 to transmit the transformed beam to the MCF 420.

Figure 4B:
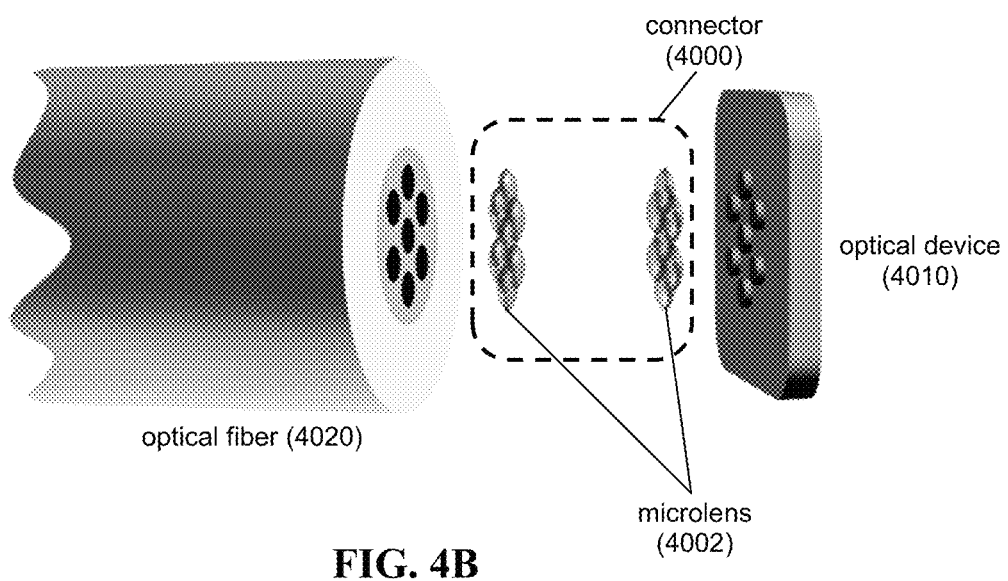
Figure 4C:
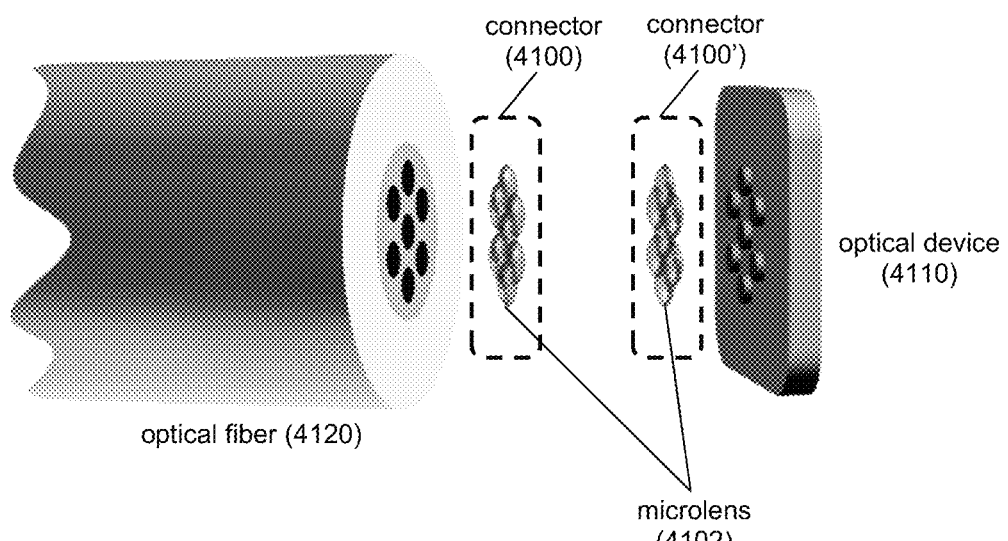

FIG. 4B shows another optical coupling system, which includes an integrated connector 4000 disposed between an optical device 4010 and an optical fiber 4020. The connector 4000 includes a pair of arrays, in which each array includes a plurality of microlenses 4002. By aligning each microlens to a core of the fiber 4020 or to an element of the optical device 4010 (e.g., an element of an individual photodetector or photoemitter), isolated optical signals can be spatially delivered in a controlled manner through each core and to each element. FIG. 4C shows yet another coupling system, in which each optical fiber 4120 or optical device 4110 includes its own connector 4100,4100' and each connector includes an array or subarray of microlenses 4102. Additional details for the connector and lens assembly are described herein.

Lenses and Assemblies Thereof

The connectors of the present invention can employ a lens, or an array thereof, to optically couple an optical signal to another optical component. The lens can have any useful dimension, including a diameter configured to receive an optical signal from or to a single optical element, such as a core from a MCF, a photoemitter, or a photodiode. In one instance, the diameter of the lens is configured to be substantially the same as a dimension of the optical element (e.g., a core, a photoemitter, or a photodiode). In yet another instance, the diameter of the lens is configured to be substantially the same as a dimension of an optical fiber (e.g., an outer diameter of an MCF) or optical device (e.g., an array of photoemitters, an array of photodiodes, a focal plane array, etc.).

A plurality of lenses can be provided as an array or a subarray. In one instance, a plurality of lenses is provided in an array disposed on a substrate, in which each lens is arranged to optically couple with an optical element, an optical fiber, or an optical device. In yet another instance, a plurality of lenses is provided in a subarray, and each subarray is then arranged within an array disposed on a substrate. In this configuration, each lens in the subarray can be arranged to optically couple with an optical element (e.g., a core), and each subarray is arranged to optically couple with a single fiber, in which a plurality of fibers is arranged as a cable.

Each array and subarray can be characterized by any useful arrangement (e.g., a hexagonal lattice, a rectangular lattice, a triangular lattice, or an annular arrangement of each lens or each subarray containing lenses), pitch (e.g., a center-to-center distance between each lens that is of from about 10 μm to about 500 μm along any useful axis), and/or number of lenses in each array of subarray (e.g., of from about 2 to about 1000 lenses in each array or subarray; and/or of from about 2 to about 100 subarrays within each array). Each lens within the subarray or array can have any useful dimension, including any useful diameter (e.g., of from about 5 μm to about 1 mm, such as a microlens having a diameter of from about 5 μm to about 200 μm and a macrolens having a diameter of from about 200 to about 1 mm, including a lens diameter greater or equal to about 240 μm, such as of from about 200 μm to about 800 μm); any useful surface (e.g., a wavefront aberration that is less than a quarter wavelength of the radiation at the center of the wavelength band that is focused by the lens); any useful lens shape (e.g., round, square, etc.), and any useful geometry (e.g., a concave, plano-concave, convex, plano-convex, meniscus, cylindrical, Fresnel, or toric geometry).

The lens assembly can include a plurality of microlenses or macrolenses. Non-limiting exemplary microlenses include those having a diameter of from about 5 μm to about 200 μm (e.g., from 5 μm to 25 μm, 5 μm to 50 μm, 5 μm to 75 μm, 5 μm to 100 μm, 5 μm to 150 μm, 5 μm to 175 μm, 10 μm to 25 μm, 10 μm to 50 μm, 10 μm to 75 μm, 10 μm to 100 μm, 10 μm to 150 μm, 10 μm to 175 μm, 10 μm to 200 μm, 15 μm to 25 μm, 15 μm to 50 μm, 15 μm to 75 μm, 15 μm to 100 μm, 15 μm to 150 μm, 15 μm to 175 μm, 15 μm to 200 μm, 20 μm to 25 μm, 20 μm to 50 μm, 20 μm to 75 μm, 20 μm to 100 μm, 20 μm to 150 μm, 20 μm to 175 μm, 20 μm to 200 μm, 30 μm to 50 μm, 30 μm to 75 μm, 30 μm to 100 μm, 30 μm to 150 μm, 30 μm to 175 μm, 30 μm to 200 μm, 40 μm to 50 μm, 40 μm to 75 μm, 40 μm to 100 μm, 40 μm to 150 μm, 40 μm to 175 μm, 40 μm to 200 μm, 50 μm to 75 μm, 50 μm to 100 μm, 50 μm to 150 μm, 50 μm to 175 μm, 50 μm to 200 μm, 60 μm to 75 μm, 60 μm to 100 μm, 60 μm to 150 μm, 60 μm to 175 μm, 60 μm to 200 μm, 70 μm to 75 μm, 70 μm to 100 μm, 70 μm to 150 μm, 70 μm to 175 μm, 70 μm to 200 μm, 80 μm to 100 μm, 80 μm to 150 μm, 80 μm to 175 μm, 80 μm to 200 μm, 90 μm to 100 μm, 90 μm to 150 μm, 90 μm to 175 μm, or 90 μm to 200 μm), and exemplary macrolenses include those having a diameter of from about 200 μm to about 1 mm (e.g., from 200 μm to 250 μm, 200 μm to 300 μm, 200 μm to 350 μm, 200 μm to 400 μm, 200 μm to 450 μm, 200 μm to 500 μm, 200 μm to 550 μm, 200 μm to 600 μm, 200 μm to 650 μm, 200 μm to 700 μm, 200 μm to 750 μm, 200 μm to 800 μm, 200 μm to 850 μm, 200 μm to 900 μm, 200 μm to 950 μm, 250 μm to 300 μm, 250 μm to 350 μm, 250 μm to 400 μm, 250 μm to 450 μm, 250 μm to 500 μm, 250 μm to 550 μm, 250 μm to 600 μm, 250 μm to 650 μm, 250 μm to 700 μm, 250 μm to 750 μm, 250 μm to 800 μm, 250 μm to 850 μm, 250 μm to 900 μm, 250 μm to 950 μm, 250 μm to 1 mm, 300 μm to 350 μm, 300 μm to 400 μm, 300 μm to 450 μm, 300 μm to 500 μm, 300 μm to 550 μm, 300 μm to 600 μm, 300 μm to 650 μm, 300 μm to 700 μm, 300 μm to 750 μm, 300 μm to 800 μm, 300 μm to 850 μm, 300 μm to 900 μm, 300 μm to 950 μm, 300 to 1 mm, 350 to 400 μm, 350 to 450 μm, 350 to 500 μm, 350 to 550 μm, 350 to 600 μm, 350 μm to 650 μm, 350 μm to 700 μm, 350 μm to 750 μm, 350 μm to 800 μm, 350 to 850 μm, 350 μm to 900 μm, 350 μm to 950 μm, 350 μm to 1 mm, 400 μm to 450 μm, 400 to 500 μm, 400 μm to 550 μm, 400 μm to 600 μm, 400 μm to 650 μm, 400 μm to 700 μm, 400 μm to 750 μm, 400 μm to 800 μm, 400 μm to 850 μm, 400 μm to 900 μm, 400 μm to 950 μm, 400 μm to 1 mm, 450 μm to 500 μm, 450 μm to 550 μm, 450 μm to 600 μm, 450 μm to 650 μm, 450 μm to 700 μm, 450 μm to 750 μm, 450 μm to 800 μm, 450 μm to 850 μm, 450 μm to 900 μm, 450 μm to 950 μm, 450 μm to 1 mm, 500 μm to 550 μm, 500 μm to 600 μm, 500 μm to 650 μm, 500 μm to 700 μm, 500 μm to 750 μm, 500 μm to 800 μm, 500 μm to 850 μm, 500 to 900 μm, 500 μm to 950 μm, 500 μm to 1 mm, 750 μm to 800 μm, 750 μm to 850 μm, 750 to 900 μm, 750 μm to 950 or 750 μm to 1 mm).

Each lens, subarray, or array dimension can include those that effectively couple with a dimension of the MCF (e.g., such as a cladding outer diameter, core diameter, core arrangement, core pitch, cable diameter, cable arrangement, etc.). Furthermore, lenses may be made in any useful manner, including by micromolding, machining (e.g., micromachining), injection molding compression molding, embossing (e.g., photoembossing), photolithography, ion milling, laser ablation, printing (e.g., ink-jet printing), etc., as well as include any other useful component, such as an anti-reflective coating, an anti-stiction coating, nanostructures, etc. Exemplary methods and components are described in U.S. Pat. Nos. 6,402,996, 6,597,510, and 7,434,299, as well as U.S. Pat. Pub. No. 2013/0155522, each of which is incorporated herein by reference in its entirety.

Figure 5A:
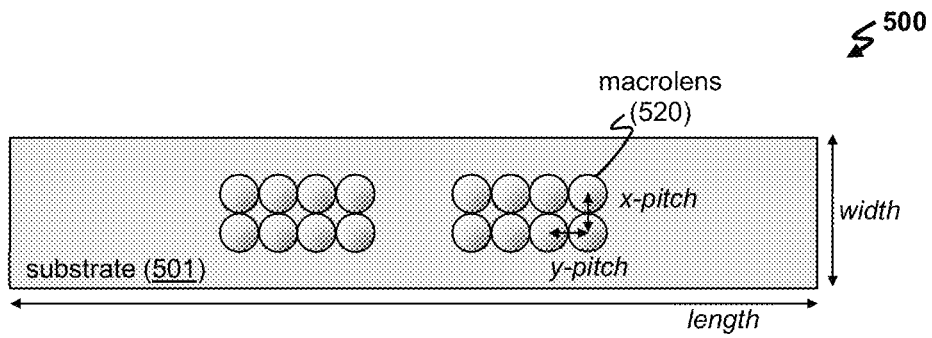
FIG. 5A-5C provides schematics of an exemplary lens assembly 500 having macrolenses 520 in (A) a plan view, (B) a side view, and (C) a perspective view.
Figure 5B:
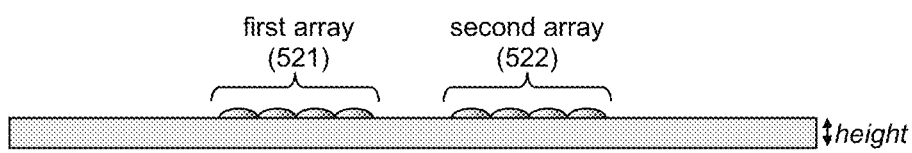
Figure 5C:
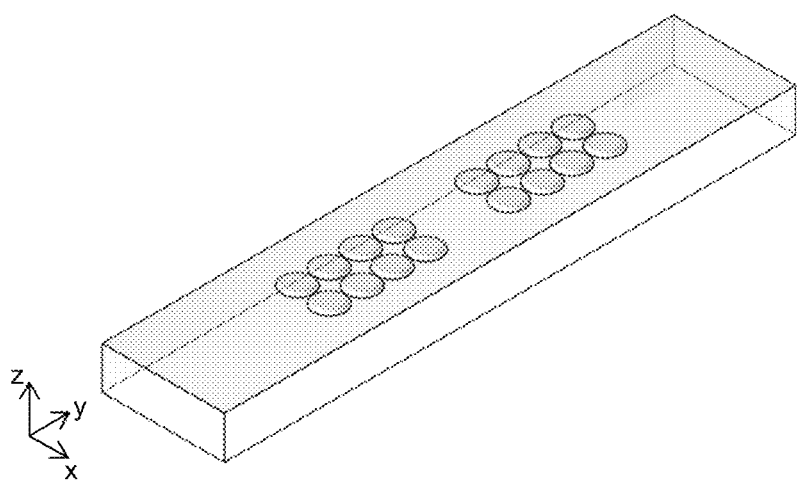

FIG. 5A-5C provides an exemplary array of lenses, in which the array is provided as a lens assembly 500. The assembly includes two arrays, and each array includes a plurality of lenses (e.g., macrolenses 520) disposed on a substrate 501. As seen in FIG. 5B, the assembly 500 has a first array 521 and a second array 522, and each array includes eight macrolenses 520.

Figure 6A:
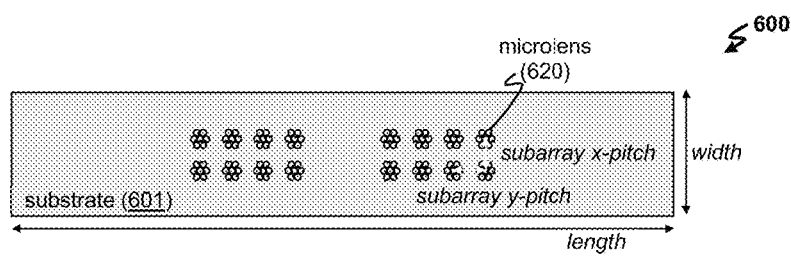
FIG. 6A-6D provides schematics of an exemplary lens assembly 600 having subarrays of microlenses 620 in (A) a plan view, (B) a side view, (C) a close-up view of the subarray 623, and (D) a perspective view.
Figure 6B:
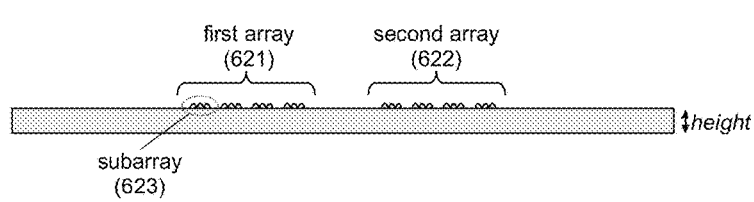
Figure 6C:
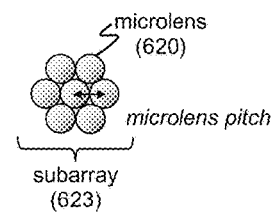
Figure 6D:
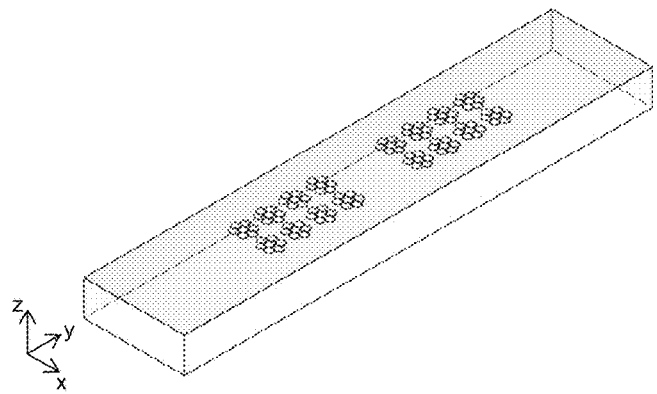

FIG. 6A-6D provides an exemplary array of lenses, in which the array is provided as a lens assembly 600 having microlenses 620 disposed on a substrate 601. As seen in FIG. 6B, the assembly 600 has a first array 621 and a second array 622, and each array includes eight subarrays 623. Each subarray is separated by a subarray pitch (e.g., a center-to-center distance between two subarrays, as seen in FIG. 6A). In addition, as seen in FIG. 6C, each subarray 623 includes a plurality of microlenses 620 that are separated by a microlens pitch (e.g., a center-to-center distance between two microlenses). Each microlens can be packed in any useful manner (e.g., in a hexagonal close-packed arrangement of a plurality of microlenses within the subarray, in which each subarray is then arranged on 250 µm centers) and have any useful dimension (e.g., a diameter of about 39 µm centers).

Figure 7A:
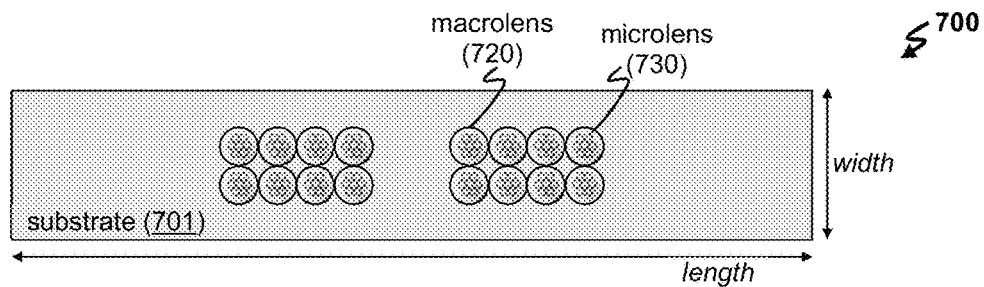
FIG. 7A-7C provides schematics of an exemplary lens assembly 700 having macrolenses 720 and microlenses 730 in (A) a plan view, (B) a side view, and (C) a perspective view.
Figure 7B:
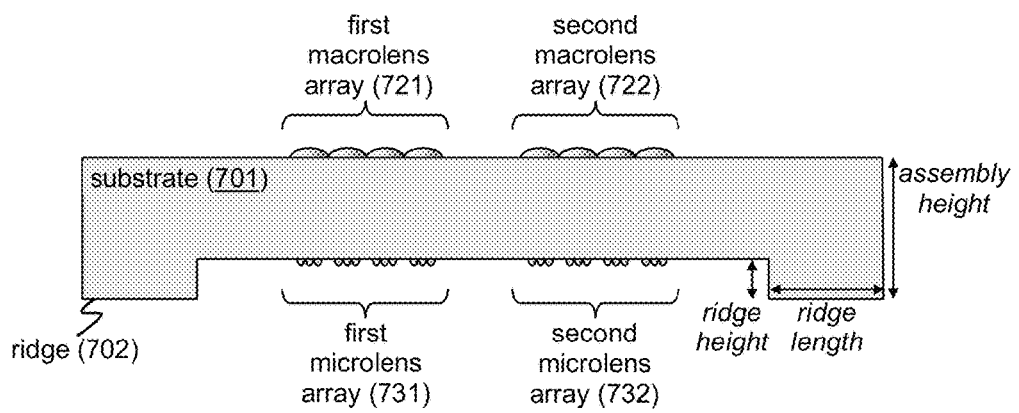
Figure 7C:
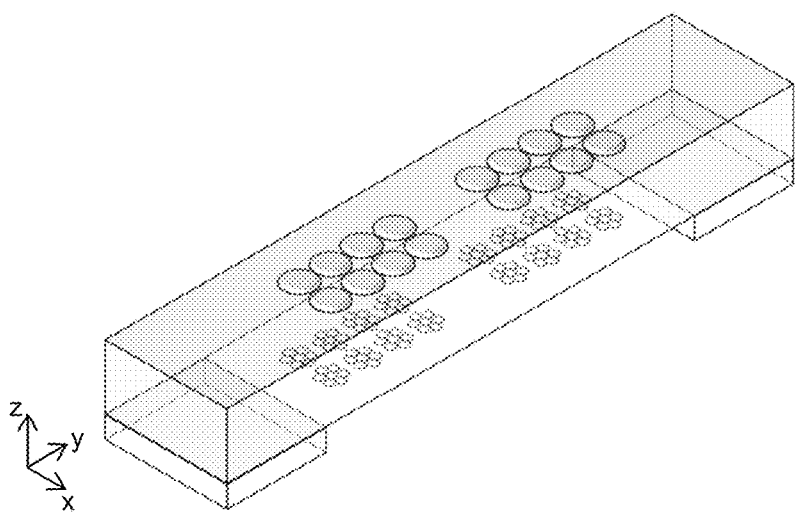

FIG. 7A-7C provides an optical assembly 700 that combines a microlens array with a macrolens array (e.g., a front-facing macrolens array and a back-facing microlens array or vice versa). As seen in FIG. 7A, the assembly 700 includes an array of macrolenses 720 and array of microlenses 730 disposed on different surfaces of a substrate 701. Each macrolens 720 is aligned with each subarray of microlenses 730. As can be seen in FIG. 7B, the assembly includes a first macrolens array 721 including a plurality of macrolenses and a second macrolens array 722 including a plurality of macrolenses, and each of these arrays are disposed on the same surface of the substrate 701. On the opposing surface of the substrate 701, the assembly includes a first microlens array 731 and a second microlens array 732. Each microlens array includes a plurality of subarrays (e.g., eight subarrays having a rectangular arrangement in FIG. 7A), and each subarray in turn includes a plurality microlenses (e.g., seven microlenses having a hexagonal arrangement in FIG. 7A). As seen in FIG. 7B, each center of each macrolens is aligned to each center of each subarray of microlenses.

The assembly can have any useful features, such as a ridge disposed on each end of the assembly (e.g., to facilitate alignment of the assembly within the connector). The assembly can include any useful dimension, such as its own width (e.g., along the x-axis, as in FIG. 7A, such as of from about 500 µm to 4 mm, including 750 µm±20 µm); length (e.g., along the y-axis, as in FIG. 7A, such as of from about 500 µm to 10 mm, including 4 mm±20 µm); and height (e.g., along the z-axis, as in FIG. 7B, such as of from about 50 µm to 1 mm, including 660 µm±5 µm), as well as the length of the ridge (e.g., along the y-axis, as in FIG. 7B, such as of from about 500 µm to 4 mm, including 625 µm±20 µm) and height of the ridge (e.g., along the z-axis, as in FIG. 7B, such as of from about 50 µm to 1 mm, including 110 µm±5 µm)

Each assembly can have any useful subarray pitch (e.g., a subarray x-pitch, which is the center-to-center distance between two subarrays along the x-axis, such as of from about 10 µm to about 500 µm, including 250 µm±2 µm; and a subarray y-pitch, which is the center-to-center distance between two subarrays along the y-axis, such as of from about 10 µm to about 500 µm, including 250 µm±2 µm); lens pitch (e.g., a x-pitch, which is the center-to-center distance between two lenses along the x-axis, such as of from about 10 µm to about 500 µm, including 250 µm±2 µm; and a y-pitch, which is the center-to-center distance between two lenses along the y-axis, such as of from about 10 µm to about 500 µm, including 250 µm±2 µm); microlens pitch (e.g., a microlens x-pitch, which is the center-to-center distance between two microlenses along the x-axis, such as of from about 5 µm to about 50 µm, including 39 µm±2 µm; and a microlens y-pitch, which is the center-to-center distance between two microlenses along the y-axis, such as of from about 5 µm to about 100 µm, including 39 µm±2 µm); subarray or array width (e.g., along the x-axis); subarray or array length (e.g., along the y-axis); and subarray or array height (e.g., along the z-axis). In addition, the substrate or assembly can have its own width (e.g., along the x-axis, as in FIGS. 5A, 6A, such as of from about 500 µm to 4 mm, including 750 µm±20 µm); length (e.g., along the y-axis, as in FIGS. 5A, 6A, such as of from about 500 µm to 10 mm, including 4 mm±20 µm); and height (e.g., along the z-axis, as in FIGS. 5B, 6B, such as of from about 50 µm to 1 mm, including 200 µm±5 µm).

The lenses and arrays can be formed from any useful material (e.g., an Ultem™ thermoplastic or any other material described herein) and fabricated in any useful manner (e.g., molded in a diamond turned mold insert for the lens surface and/or coated with an anti-reflection coating on a top and/or bottom surface of the substrate with R less than about 0.5%). In one instance, in order to provide the largest possible fill-factor, the diameter of the macrolens is greater than about 200 µm or the diameter of the microlens is greater than about 36 µm. Further, the lens can have any useful geometry, including any useful radius of curvature $R_c$ (e.g., $R_c$ of about 182 µm or about 190 µm for a macrolens or $R_c$ of about 28 µm or about 50 µm for a microlens) or aspherical constant k (e.g., k=−1, such as for a parabolic lens).

The lenses and arrays can possess any desired tolerances, such as an optically flat surface (e.g., of the substrate, such as a bottom surface that is optically flat to about one quarter wave or less), parallel surfaces (e.g., of the substrate, such as top and bottom surfaces that are parallel to about 1° or less), an accurate centering (e.g., a lens-to-lens centering difference of about 10% or less, such as 250 µm±2 µm or 39 µm±2 µm), an accurate subarray-to-subarray centering (e.g., a subarray-to-subarray centering difference of about 10% or less, such as 250 µm±2 µm), an accurate array-to-array centering (e.g., an array-to-array centering difference of about 10% or less, such as 250 µm±2 µm), an accurate curvature (e.g., a radius of curvature accuracy of about 0.5% or less), an accurate surface (e.g., a deviation of about one quarter wave or less), and/or an accurate front-to-back alignment (e.g., an alignment of a front-facing lens array and a back-facing lens array having an accuracy of about 0.5% or less, such as ±2 µm).

Connectors

Figure 8A:
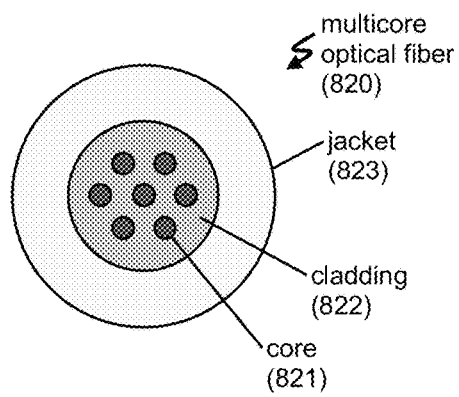
FIG. 8A-8B provides schematics of (A) a cross-sectional view of an exemplary multicore optical fiber 820; and (B) a cross-sectional view of an exemplary connector 800.
Figure 8B:
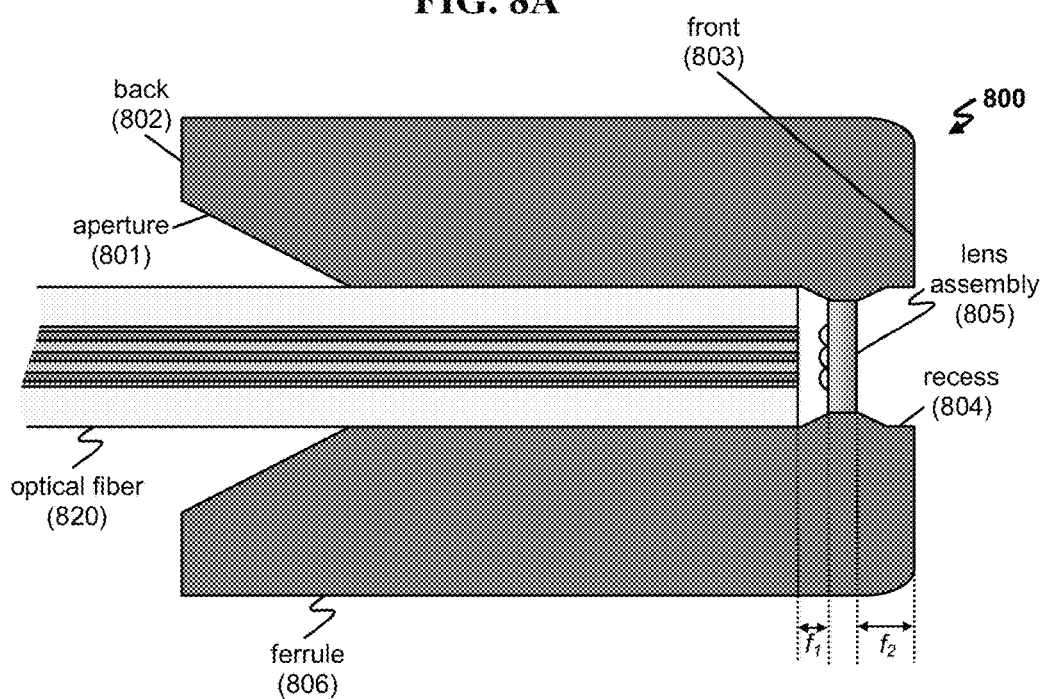

The optical connector connects an optical input (e.g., from an optical fiber) to an optical output (e.g., an optical fiber, an optical device, or another optical component). Exemplary optical connectors can include an optical fiber or a waveguide (e.g., a rectangular, slab, planar, or strip waveguide). The connectors can include any useful components and structures configured to transmit an optical signal from or to a multicore optical fiber (MCF). As seen in FIG. 8A, an exemplary MCF 820 includes a plurality of cores 821 surrounded by cladding 822 to isolate each core. Optionally, a jacket 823 surrounds the cladding 822. The connectors herein can be structured to optically couple with any useful MCF. As seen in FIG. 8B, an exemplary connector 800 includes various components that interface with the optical fiber 820. The connector 800 includes a lens assembly 805 that is arranged to optically transmit or receive signals to the cores of the fiber 820. In particular embodiments, the connector 800 is configured to position the lens assembly 805 in any useful manner (e.g., disposed within a recess 804 having a tapered portion) that accommodates a useful focal distance $f_1$ between the core and the lens, as well as useful distance $f_2$ between the lens and the front 803 portion of the connector 800. Distance $f_2$ can be calibrated to ensure that the optical path from the lens assembly 805 and the receiving optical device or receiving lens assembly is sufficient to provide maximal optical coupling.

The connector can also employ any useful structure to position the optical fiber at the focal distance $f_1$. In one embodiment, the connector includes an aperture 801 (e.g., an aperture having tapered walls) configured to adapt to an end of the optical fiber 820 (e.g., a cut end of the optical fiber). Such aperture and recess features can be integrated into a single body, such as a ferrule. As seen in FIG. 8B, the ferrule 806 includes an aperture 801 disposed at the back 802 portion to accommodate an end of the optical fiber 820, as well as a recess 804 disposed at the front 803 portion of the ferrule to accommodate the lens assembly 805. The ferrule can be configured to adapt any fiber, lens, and assemblies thereof (e.g., any described herein).

Figure 9A:
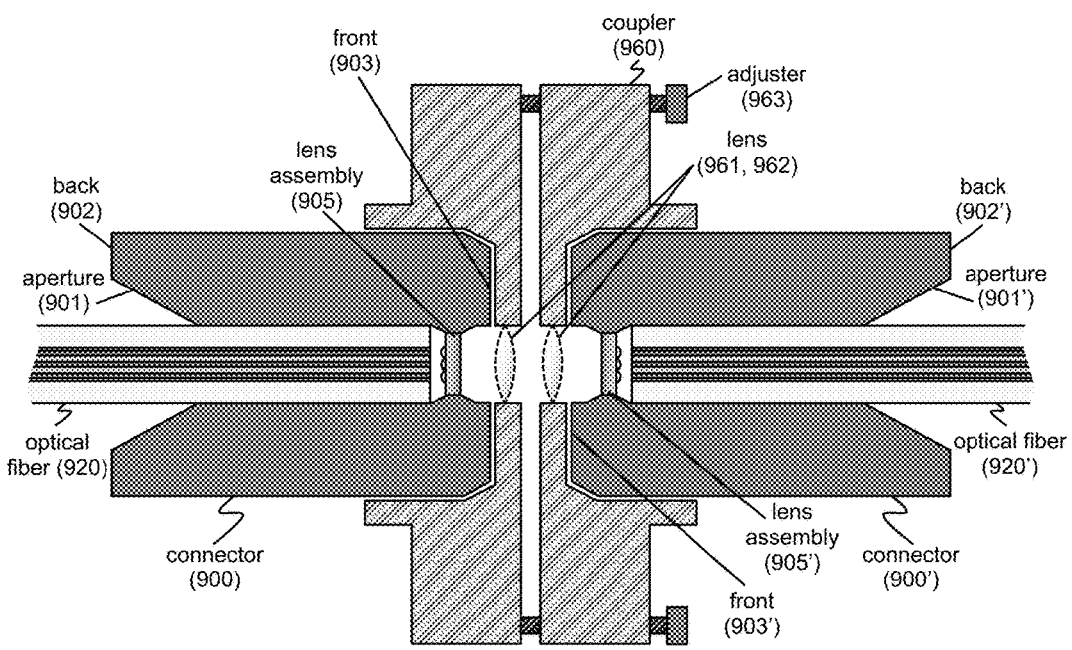
FIG. 9A-9C provides schematics of exemplary optical coupling systems for two multicore optical fibers. Shown are (A) two connectors 900,900' for use with an adjustable coupler 960, (B) two connectors 9000,9000' for use with an alignment coupler 9060, and (C) two connectors 9100,9100' having an integrated adjuster 9130.

Two or more connectors can be coupled in any useful manner. Each connector, in turn, can include any useful connection to an optical device (e.g., a photoemitter or a photodetector), optical component (e.g., reflector and/or lens), or lens assembly. Furthermore, each connector can be the same or different (e.g., possessing different configurations and types of lenses or optical devices). In one instance, two connectors are coupled by way of a third structure (a coupler) that adapt to a surface of a first connector and a second connector. FIG. 9A shows an exemplary coupler 960 configured to align the first connector 900 and the second connector 900'. As can be seen, each connector 900,900' includes a lens assembly 905,905' disposed at the front 903,903' portion to position the lens assembly, as well as an aperture 901,901' disposed at the back 902,902' portion to accommodate an end of the optical fiber 920,920'. The coupler 960 is configured to align the first connector 900 and the second connector 900' and to include an adjuster 963 configured to adjust a position of the first and second connectors to a desired collimated gap. Optionally, the coupler 960 can include a pair of collimating lenses 961,962 disposed within each section of the coupler 960, such that the position of the collimating lenses 961,962 within the coupler 960 provides the desired collimated optical signal for effective transmission.

Figure 9B:
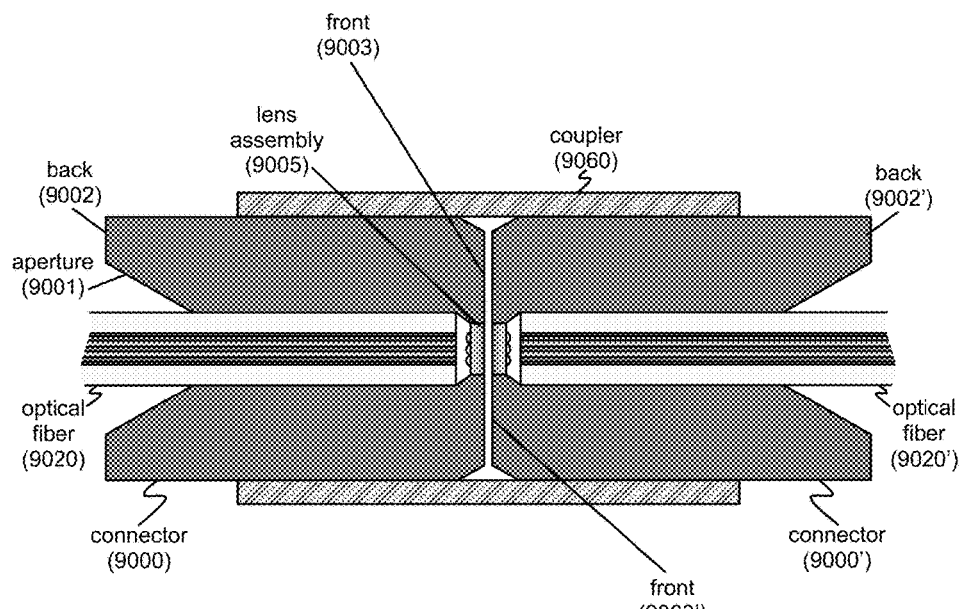

The coupler can have any useful structure. As seen in FIG. 9A, the coupler 960 can include two separate sections, in which each section couples to each connector 900,900'; and the section is associated by way of an adjuster 963 (e.g., a translation screw configured to move the sections of the coupler and maintain a distance between two connectors). In another instance, as seen in FIG. 9B, the coupler 9060 can be configured as an alignment sheath having a first opening and a second opening, in which the first opening is configured to accept a first connector 9000 and a second opening is configured to accept a second connector 9000'. The coupler 9060 can include any useful structure (e.g., protrusions, bumps, ridges, etc.) to maintain a desired collimated gap between the front 9003,9003' portion of the first and second connectors. Each connector 9000,9000', in turn, includes an aperture 9001 at the back 9002,9002' portion to accommodate the optical fiber 9020,9020'.

Figure 9C:
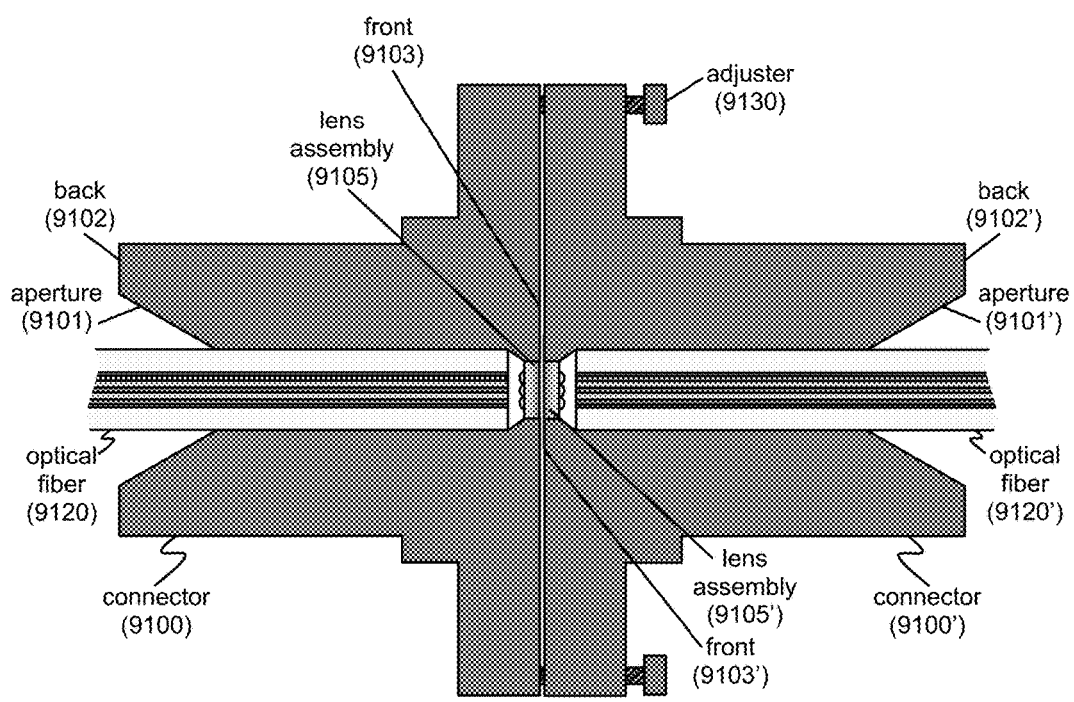

In yet another instance, the coupling structure can be integrated into the connecting structure. For instance, the connector can include a structural portion configured to allow coupling between two connectors. FIG. 9C provides an exemplary integrated structure, in which the connector is configured to position a lens assembly, to adapt to an optical fiber, as well as to couple with another connector. The first connector 9100 can include a coupling structure (e.g., a flange) configured to adapt an adjuster 9130 and a front 9103 surface configured to couple to the second connector 9100'. As can be seen, the front 9103 surface of the first connector 9100 interfaces (or mates with) with the front 9103' surface of the second connector 9100'. The collimated gap between a first lens assembly 9105 and a second lens assembly 9105' is controlled by the adjuster 9130, which can be rotated to either increase or decrease the gap. Each connector 9100, 9100' also includes an aperture 9101,9101' disposed at the back 9102,9102' portion to accommodate optical fibers 9120,9120'.

Connectors, including the ferrule or the lens assembly, and couplers can be formed from any useful material, including glass, a polymer (e.g., a thermoplastic, such as an amorphous thermoplastic polyimide (TPI) and/or polyetherimide (PEI) resin, which are commercially available as Ultem™ or Extem™ polymers, fluoropolymer, polystyrene, polyester, polyethersulfone, cyclic olefin polymer (COP), poly(methyl methacrylate) (PMMA), polycarbonate (PC), nylon, and copolymers thereof, which can optionally include one or more inorganic materials, such as transparent inorganic materials (e.g., $TiO_2$, diamond, $ZrO_2$, $Al_2O_3$, $SiO_2$, or $MgF_2$ particles)), a silica, a photonic crystal (e.g., ID, 2D, or 3D photonic crystals), or a semiconductor. Other exemplary materials are described in U.S. Pat. Nos. 6,445,939 and 6,564,087, as well as U.S. Pub. Nos. 2009/0326384, 2013/0030274, 2013/0039616, 2014/0024902, and 2014/0142664, each of which is incorporated herein by reference in its entirety. In one instance, the ferrule can be formed from any useful material with sufficient rigidity to minimize bending of the optical fiber, and the lens assembly can be formed from any optically clear material capable of relaying an optical signal with minimal loss. Optionally, the lens assembly can include one or more anti-reflection coatings on any useful surface (e.g., back and/or front surface, as designated in FIG. 8B).

Multicore Optical Fiber

The optical coupling system, as well as any connectors, can be adapted to accommodate any useful optical fiber (e.g., a multicore optical fiber). The fiber can have any useful structure or dimension. Each fiber can include any useful number of cores (e.g., 2, 3, 5, 6, 7, 8, 12, or 19 cores) packed in any useful manner (e.g., a hexagonal lattice, a rectangular lattice, a triangular lattice, or an annular arrangement) and disposed within cladding, which in turn may be optionally surrounded by a jacket. The fiber can have any useful outer diameter (e.g., a cladding outer diameter (OD) of from about 75 µm to about 500 µm, such as from 100 µm to 500 µm, 125 µm to 500 µm, 150 µm to 500 µm, 200 µm to 500 µm, 225 µm to 500 µm, 250 µm to 500 µm, 75 µm to 150 µm, 75 µm to 200 µm, 75 µm to 250 µm, 75 µm to 300 µm, 75 µm to 400 µm, 75 µm to 500 µm, 100 µm to 150 µm, 100 µm to 200 µm, 100 µm to 250 µm, 100 µm to 300 µm, 100 µm to 400 µm, 100 µm to 500 µm, 150 µm to 200 µm, 150 µm to 250 µm, 150 µm to 300 µm, 150 µm to 400 µm, 150 µm to 500 µm, 200 µm to 250 µm, 200 µm to 300 µm, 200 µm to 400 µm, 200 µm to 500 µm, 225 µm to 250 µm, 225 µm to 300 µm, 225 µm to 400 µm, 225 µm to 500 µm, 250 µm to 300 µm, 250 µm to 400 µm, or 250 µm to 500 µm); any useful core diameter (e.g., a core diameter of from about 5 µm to about 50 µm, such as from 5 µm to 7 µm, 5 µm to 10 µm, 5 µm to 13 µm, 5 µm to 15 µm, 5 µm to 20 µm, 5 µm to 25 µm, 5 µm to 30 µm, 5 µm to 35 µm, 5 µm to 40 µm, 5 µm to 45 µm, 7 µm to 10 µm, 7 µm to 13 µm, 7 µm to 15 µm, 7 µm to 20 µm, 7 µm to 25 µm, 7 µm to 30 µm, 7 µm to 35 µm, 7 µm to 40 µm, 7 µm to 45 µm, 7 µm to 50 µm, 10 µm to 13 µm, 10 µm to 15 µm, 10 µm to 20 µm, 10 µm to 25 µm, 10 µm to 30 µm, 10 µm to 35 µm, 10 µm to 40 µm, 10 µm to 45 µm, 10 µm to 50 µm, 13 µm to 15 µm, 13 µm to 20 µm, 13 µm to 25 µm, 13 µm to 30 µm, 13 µm to 35 µm, 13 µm to 40 µm, 13 µm to 45 µm, 13 µm to 50 µm, 15 µm to 20 µm, 15 µm to 25 µm, 15 µm to 30 µm, 15 µm to 35 µm, 15 µm to 40 µm, 15 µm to 45 µm, 15 µm to 50 µm, 17 µm to 20 µm, 17 µm to 25 µm, 17 µm to 30 µm, 17 µm to 35 µm, 17 µm to 40 µm, 17 µm to 45 µm, 17 µm to 50 µm, 20 µm to 25 µm, 20 µm to 30 µm, 20 µm to 35 µm, 20 µm to 40 µm, 20 µm to 45 µm, or 20 µm to 50 µm); and/or any useful pitch (e.g., a center-to-center lens dimension of from about 10 µm to about 80 µm, such as from 10 µm to 20 µm, 10 µm to 30 µm, 10 µm to 50 µm, 10 µm to 70 µm, 15 µm to 20 µm, 15 µm to 30 µm, 15 µm to 50 µm, 15 µm to 70 µm, 15 µm to 80 µm, 20 µm to 30 µm, 20 µm to 50 µm, 20 µm to 70 µm, 20 µm to 80 µm, 25 µm to 30 µm, 25 µm to 50 µm, 25 µm to 70 µm, 25 µm to 80 µm, 30 µm to 50 µm, 30 µm to 70 µm, 30 µm to 80 µm, 40 µm to 50 µm, 40 µm to 70 µm, 40 µm to 80 µm, 45 µm to 50 µm, 45 µm to 70 µm, 45 µm to 80 µm, 50 µm to 70 µm, 50 µm to 80 µm, 55 µm to 70 µm, 55 µm to 80 µm, 60 µm to 70 µm, 60 µm to 80 µm, or 70 µm to 80 µm). In one instance, the optical fiber is a multicore optical fiber having seven cores arranged in a hexagonal pattern (i.e., six outer cores surrounding a central single core) with a pitch of about 39 µm, a core diameter of about 26 µm, an outer cladding diameter of about 125 µm, and an outer jacket diameter of about 250 µm.

The connectors, lenses, and lens assemblies can be adapted to accommodate such dimensions and numbers of cores. For instance, a lens can be configured to have a dimension described herein for a cladding outer diameter or a core diameter; a number of lenses as described herein for a number of cores; and/or an arrangement of lenses as described herein for the packing arrangement of the cores. For instance, a core having a diameter of about 26 µm can be employed with a lens having a diameter of about 39 µm.

Each core within the MCF can be arranged to sufficiently suppress core-to-core crosstalk. Optionally, each core can be surrounded by a trench. Alternatively, the MCF may include coupled-core fibers that support supermodes, e.g., by arranging the cores closer together to facilitate linear mode coupling. Each fiber (or MCF) in turn may be used to fabricate a cable including a plurality of bundled MCFs. Additional optical fibers are described in Richardson D J et al., "Space-division multiplexing in optical fibres," Nat. Photonics 2013; 7:354-62; and van Uden RGH et al., "Ultra-high-density spatial division multiplexing with a few-mode multicore fibre," Nat. Photonics 2014; 8:865-70, each of which is incorporated herein by reference in its entirety.

Optical Device, Such as Emitters and Detectors

The optical systems herein can be used in conjunction with optical devices that either receive or transmit an optical signal from or to an optical fiber. Exemplary optical systems can include a photoemitter (e.g., a vertical-cavity surface-emitting laser (VCSEL)) or a photodetector (e.g., a photodiode (PD)).

The VCSELs and PDs can have any useful structure (e.g., single oxide or dual oxide VCSELs), emission properties (e.g., wavelength, power, etc.), and detection properties. Such VCSELs can be provided in any useful array (e.g., a hexagonal array of seven VCSELs including six outer VCSELs surrounding a center VCSEL), and the lens assembly can be arranged to have a lens that optically couple to each VCSEL within the array. Similarly, the PDs can be provided in any useful array (e.g., a hexagonal array of seven PDs including six outer PDs surrounding a center PD), and the lens assembly can be arranged to have a lens that optically couple to each PD within the array. Each array of VCSELs and PDs can be further arranged in a larger array, thereby forming an array including a plurality of subarrays of VCSELs or PDs (e.g., a 4×2 array including eight subarrays, in which each subarray includes seven VCSELs).

The optical device can include any number of components to transmit, receive, relay, power, and store one or more signals (e.g., optical, electrical, and/or electromagnetic signals). For instance, the device can include an emitter configured to emit an optical signal, and the device can include a detector configured to detect an optical signal. Finally, the device can also include a receiver configured to receive an optical input signal (e.g., from an external unit), convert this optical signal into an electrical signal, and relay this electrical signal to circuitry. The circuitry, in turn, can be connected electrically to one or more emitters and detectors. In particular embodiments, the circuitry include one or more control electronics, components, and logic processes to encode and decode an electrical signal, apply an algorithm to an electrical signal into an electrical input for emitter(s) and/or detector(s), store power, and/or transmit power.

Exemplary photoemitters or photodetectors can include a photovoltaic cell, a III-V structure (e.g., including a III-V material, such as GaAs, GaN, GaP, GaSb, InN, InP, InAs, InSb, BN, BP, Bas, AlN, AlP, AlAs, or AlSb, as well as alloys thereof, such as AlGaAs, InGaAs, InGaP, AlInAs, AlInSb, GaAsN, GaAsP, GaAsSb, AlGaN, AlGaP, InGaN, AlGaInP, or InGaAsP having any useful stoichiometry), a photodiode (e.g., a light-emitting diode), a photodetector (e.g., an Si detector, such as those including p- and n-doped regions on a silicon; a p-i-n (positive, intrinsic, and negative) photodiode; or a resonant cavity photodetector (RCPD)), and a laser (e.g., a laser diode or a vertical cavity surface-emitting laser), as well as arrays thereof. Exemplary optical emitters and detectors are described in U.S. Pat. Nos. 6,628,695, 7,127,301, 7,218,388, 7,393,145, 7,773,840, 8,000,804, 8,285,394, 8,323,955, 8,329,503, 8,592,249, 8,614,395, 8,680,810, 8,728,857, and 8,729,673; and U.S. Pub. Nos. 2012/0287420, 2013/0079615, 2014/0084450, and 2014/0102520, as well as Chen R et al., "Nanolasers grown on silicon," Nature Photon. 2011 March; 5:170-5; Ohira K et al., "On-chip optical interconnection by using integrated III-V laser diode and photodetector with silicon waveguide," Opt. Express 2010 July; 18(15):15440-7; and El-Fatatry A, "Optical microsystems, mechano-optical-electro-mechanical systems—MOEMS," in *MEMS Aerospace Applications*, February 2004 (79 pp.), NATO Science and Technology Organization (Ref. No. RTO-EN-AVT-105), each of which is incorporated herein by reference in its entirety.

EXAMPLES

Example 1: Coupling of VCSELs and PDs to Multicore Optical Fibers

Coupling between multicore optical fibers and optical devices can be difficult on the micron-scale. For instance, in order to achieve low-loss optical coupling from a VCSEL to a fiber core, the optical system must adapt the high numerical aperture of the VCSEL (e.g., NA~0.3) to the lower numerical aperture of the fiber core (e.g., NA~0.2). This can be achieved by choosing an appropriate system magnification and is traditionally performed using two lenses of different focal lengths with a collimated beam in the center. Fiber-to-package connections are generally made in this collimated space, where spatial misalignment is relatively forgiving provided the surfaces are kept parallel. Note that while a microlens designs with a 250 µm fiber pitch can support collimated beams over many millimeters before diffraction becomes problematic, a MCF design with a pitch of 39 µm allows only a distance of a few hundred microns. Tolerance to misalignment remains a few microns, better than for single mode systems.

Optical coupling from the fiber core to the photodiode is almost the inverse problem, but somewhat more challenging because the emitting fiber core is filled with light and is relatively large as compared to the core-to-core spacing.

FIG. 1 shows a two-element microlens design (i.e., a single microlens of a first connector 100 that is optically coupled to another single microlens of a second connector 100'). This design achieves the desired coupling requirements. It can be implemented, e.g., with two microlenses at a magnification of about 1.5× and having light collimated in the central gap. This design can be optimized for fiber-to-photodiode coupling, as well as for VCSEL-to-fiber coupling.

Two such microlens arrays would be used to relay the output of six VCSELs to the six outer cores of a multicore fiber (e.g., see FIG. 4A). For instance, to achieve the about 1.5× magnification, the focal length of each microlens in the array nearest to the optical devices (e.g., optoelectronic devices, such as VCSELs or photodiodes) can be about 0.75× that of each microlens in the array nearest to the optical fibers. In one instance, each VCSEL spot can be magnified from about 4 μm to about 6 μm onto each fiber core, which has the benefit of decreasing the divergence angle to within the acceptance angle of the fiber core. In the case of the photodiode, the fiber core can be magnified by about 0.75× onto the surface of the photodiode, which has the benefit of allowing a smaller diameter photodiode with less capacitance and hence higher bandwidth. Optical systems can be optimized to realize high-efficiency optical coupling between the VCSEL and the optical fiber and between the optical fiber and the PD.

Example 2: Expanded Beam Connector System

The present invention also includes optical systems that employ expanded beam interconnects for parallel arrays of MCF. In one non-limiting embodiment, each core of the MCF is optically coupled to a pairs of lenses. As seen in FIG. 1, each core of the MCF is coupled to a first lens associated with the first connector 100 and a second lens associated with the second connector 100'. This approach uses a pair of microlens elements for each core of the fiber (e.g., a seven-core MCF using seven microlens pairs). FIG. 6A-6D provides an exemplary microlens assembly for use in this system. This approach keeps each channel (of each core) spatially isolated from its neighbors. In addition, this approach includes manufacturing very small lenses (e.g., a microlens assembly), working with small gaps in the collimated space, and providing rotational alignment (e.g., as provided by connectors and the associated coupler or coupling structures, such as any described herein).

Example 3: Imaging Connector System

The entire emitting MCF facet (or an array of lasers) can be imaged onto the second MCF facet (or a photodiode array) with all channels traversing a shared optical path. Imaging can employ one or more lenses, and a magnification ratio of unity can be required to match core-to-core spacing at each side. The optical device pitch could be altered to allow magnification or demagnification and to provide a corresponding change in numerical aperture. The use of two lenses in a 4f-like configuration (e.g., as in FIG. 2) would make this system operate much like an expanded beam interconnect, albeit with a tighter restriction on gap spacings. FIG. 5A-5C provides an exemplary macrolens assembly. Varying the gap in the 2f region may allow reduced feedback (e.g., varying the gap between the end of the optical fiber 220 and the macrolens 202). Fourier filtering could occur in the Fourier plane in the center of the collimated gap 230.

Example 4: Hybrid System

When coupling an optoelectronic device array to a multicore fiber, there may be a mismatch in both optical mode size and numerical aperture. One exemplary solution includes effectively magnifying the optical beam between each optical device and each fiber core with a magnification value different from unity. The use of imaging connectors (e.g., one lens pair per fiber, such as in Example 3 herein) can allow imaging of a device array to an array of fiber cores. Such an arrangement can add a constraint to the achievable magnification values because each individual core and the ensemble array of cores are imaged together. Thus, one must choose a single magnification value for both the individual cores and the ensemble array. In addition, varying the focal length of one lens relative to the other may result in magnifying the entire array pitch. One exemplary system to simultaneously match the array locations on both ends and allow independent adjustment of the numerical aperture/spot size is to add at least a single array of per-core optics (one microlens per core). This represents a hybrid system having an array of both microlenses and macrolenses, as provided in FIGS. 3 and 4A-4C. An exemplary lens array for use in this approach is provided in FIG. 7A-7C.

This hybrid system benefits from an enhanced tolerance to x-y misalignment between a lens and the core (or the optical device) and from an extended collimated gap length. For instance, x-y misalignment tolerance scales as the diameter of each beam, so systems employing macrolenses are more tolerant because a beam diameter for a macrolens is generally greater than a beam diameter for a microlens. Furthermore, the length of the collimated gap scales as the beam diameter squared. Thus, longer collimated gaps can be employed with systems employing macrolenses, as compared to microlenses. In one non-limiting example, the acceptable collimated gap can be of from about 0.1 mm to about 1 mm, which can allow for use of optional optical elements (e.g., a 90° turning optic) that require a longer propagation path length.

OTHER EMBODIMENTS

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. An optical coupling system for a multicore optical fiber, the system comprising:
   a first connector configured to transmit an optical signal from a first multicore optical fiber, wherein the first connector comprises:
      a first lens assembly configured to relay the optical signal from each core of the first multicore optical fiber; and a first ferrule configured to adapt to an end of the first multicore optical fiber, wherein the first ferrule is configured to position the first lens assembly at a first focal distance from the end of the first multicore optical fiber; and a second connector configured to relay an optical signal from the first multicore optical fiber to a second multicore optical fiber, wherein the second connector comprises:

a second lens assembly configured to relay the optical signal to each core of the second multicore optical fiber; and a second ferrule configured to adapt to an end of the second multicore optical fiber, wherein the second ferrule is configured to position the second lens assembly at a second focal distance from the end of the second multicore optical fiber;

wherein:

the first and second connectors are separated by a collimated gap, the first and second connectors are configured to maintain the collimated gap, and at least one of the first and second lens assemblies comprises a subarray of microlenses wherein each microlens is configured to be aligned with a respective core of the first or second multicore optical fiber.

2. The coupling system of claim 1, further comprising a reflector disposed between the first lens assembly and the second lens assembly, wherein the reflector is configured to relay the optical signal from the first multicore optical fiber to the second multicore optical fiber.

3. The coupling system of claim 1, further comprising an adjuster configured to adjust a position of the first and second connectors to a desired collimated gap.

4. The coupling system of claim 1, further comprising:

a coupler configured to align the first and second connectors, thereby forming an optical path between the first and second multicore optical fibers, wherein the coupler is also configured to adjust a position of the first and second connectors to a desired collimated gap.

5. The coupling system of claim 1, wherein the first and second connectors are integrated into a same structure.

6. The coupling system of claim 1, wherein the first connector is configured to transmit a plurality of optical signals from a plurality of first multicore optical fibers.

7. The coupling system of claim 1, wherein the second connector is configured to relay a plurality of optical signals from a plurality of second multicore optical fibers.

8. An optical coupling system for one or more optical devices and a multicore optical fiber, the system comprising:

a first connector configured to transmit an optical signal to the one or more optical devices or to receive an optical signal from the one or more optical devices, wherein the first connector comprises:

a first lens assembly configured to relay the optical signal from the one or more optical devices; and a first ferrule configured to adapt to a surface of the one or more optical devices, wherein the first ferrule is configured to position the first lens assembly at a first focal distance from at least one of the one or more optical devices; and a second connector configured to relay an optical signal from the one or more optical devices to a multicore optical fiber or from the multicore optical fiber to the one or more optical devices, wherein the second connector comprises:

a second lens assembly configured to relay the optical signal to the multicore optical fiber; and a second ferrule configured to adapt to an end of the multicore optical fiber, wherein the second ferrule is configured to position the second lens assembly at a second focal distance from the end of the multicore optical fiber;

wherein:

the first and second connectors are separated by a collimated gap, the first and second connectors are configured to maintain the collimated gap, the first lens assembly comprises a subarray of one or more microlenses, and each microlens is configured to be aligned with a respective one of the one or more optical devices.

9. The coupling system of claim 8, wherein the at least one optical device comprises a photodetector or a photoemitter.

10. The coupling system of claim 8, wherein the second lens assembly comprises a subarray of microlenses and wherein each microlens is configured to be aligned with a respective core of the multicore optical fiber.

11. The coupling system of claim 8, further comprising a reflector disposed between the first lens assembly and the second lens assembly, wherein the reflector is configured to relay the optical signal from the first connector to the second connector or from the second connector to the first connector.

12. The coupling system of claim 8, wherein the first connector is configured to transmit a plurality of optical signals from a plurality of optical devices.

13. The coupling system of claim 8, wherein the second connector is configured to relay a plurality of optical signals from or to a plurality of multicore optical fibers.

* * * * *